(12) United States Patent
Glass

(10) Patent No.: US 11,040,319 B2
(45) Date of Patent: Jun. 22, 2021

(54) VORTEX MIXING BAFFLE

(71) Applicant: Harry Glass, Deckers, CO (US)

(72) Inventor: Harry Glass, Deckers, CO (US)

(*) Notice: Subject to any disclaimer, the term of this patent is extended or adjusted under 35 U.S.C. 154(b) by 0 days.

(21) Appl. No.: 14/589,992

(22) Filed: Jan. 5, 2015

(65) Prior Publication Data
US 2015/0191380 A1 Jul. 9, 2015

Related U.S. Application Data

(60) Provisional application No. 61/924,495, filed on Jan. 7, 2014.

(51) Int. Cl.
| | | |
|---|---|---|
| *B01F 5/06* | (2006.01) | |
| *B01F 5/04* | (2006.01) | |
| *B01F 3/08* | (2006.01) | |
| *C02F 1/76* | (2006.01) | |
| *C02F 1/68* | (2006.01) | |
| *C02F 1/00* | (2006.01) | |

(52) U.S. Cl.
CPC .......... *B01F 5/0451* (2013.01); *B01F 5/0463* (2013.01); *B01F 5/0614* (2013.01); *B01F 2005/0637* (2013.01); *C02F 1/006* (2013.01); *C02F 1/76* (2013.01); *C02F 2301/024* (2013.01); *C02F 2301/026* (2013.01)

(58) Field of Classification Search
CPC ............ B01F 5/0602; B01F 2005/0637; B01F 3/0865; B01F 5/0451; B01F 5/0463; B01F 5/0614

USPC .......... 366/336, 337, 338, 339, 340
See application file for complete search history.

(56) References Cited

U.S. PATENT DOCUMENTS

| 1,496,345 | A | * | 6/1924 | Lichtenthaeler | ...... B01F 5/0451 366/147 |
| 1,496,896 | A | * | 6/1924 | Laffoon | ................... B02B 1/04 366/337 |
| 1,584,046 | A | * | 5/1926 | Smith | .................. G05D 11/006 138/37 |
| 1,626,487 | A | * | 4/1927 | David | ................... B01F 5/0405 137/889 |
| 2,207,761 | A | | 7/1940 | Sayles | |
| 2,312,639 | A | * | 3/1943 | Gronemeyer | ......... B01F 3/0873 138/40 |
| 2,361,150 | A | | 10/1944 | Petroe | |

(Continued)

*Primary Examiner* — Tony G Soohoo
(74) *Attorney, Agent, or Firm* — Boudwin Intellectual Property; Daniel Boudwin

(57) ABSTRACT

The present invention provides a baffle pipe having a proximal end and a distal end encased in a pipe housing for homeowners to treat their own water sources with sodium hypochlorite. On the proximal end, the baffle pipe is in liquid communication with a cap that includes an inlet and an injection port. The inlet is in liquid communication with a water supply, wherein the injection port infuse the water flowing therethrough with a sodium hypochlorite solution. The distal end of the baffle pipe includes a plurality of angularly spaced pins and projections that position the baffle pipe within the pipe housing. Chlorinated water is ejected through a plurality of perforations along the baffle pipe and forced downstream toward the second end and a bell reducer of the pipe housing, wherein the projections and the bell reducer create a vortex for continuous mixing.

9 Claims, 4 Drawing Sheets

(56) References Cited

U.S. PATENT DOCUMENTS

| | | | | |
|---|---|---|---|---|
| 2,740,616 A * | 4/1956 | Walden | B01D 11/043 | 181/264 |
| 2,784,530 A * | 3/1957 | Dugan | A01C 23/024 | 111/123 |
| 2,784,948 A * | 3/1957 | Pahl | B01F 5/0451 | 198/657 |
| 2,816,518 A * | 12/1957 | Daggett | A23G 9/282 | 137/896 |
| 3,147,717 A * | 9/1964 | Smith | A23G 9/282 | 366/184 |
| 3,167,305 A * | 1/1965 | Backx | A23D 7/02 | 138/42 |
| 3,190,618 A * | 6/1965 | Katzen | B01F 5/0619 | 366/337 |
| 3,219,483 A * | 11/1965 | Goos et al. | B01F 5/0475 | 127/28 |
| 3,776,524 A | 12/1973 | Starke | | |
| 4,189,243 A * | 2/1980 | Black | B01F 5/0659 | 366/336 |
| 4,211,277 A * | 7/1980 | Grosz-Roll | B01F 5/0619 | 138/38 |
| 4,386,855 A * | 6/1983 | Neal, Jr. | B01F 5/0659 | 366/138 |
| 4,408,890 A * | 10/1983 | Beckmann | B01F 5/0451 | 366/155.2 |
| 4,584,106 A | 4/1986 | Held | | |
| 4,786,185 A * | 11/1988 | Knief | B01F 5/0688 | 261/108 |
| 4,859,067 A * | 8/1989 | Hoppe | B01F 5/243 | 222/564 |
| 5,333,952 A * | 8/1994 | Perdue | B01F 5/0659 | 366/336 |
| 5,865,537 A * | 2/1999 | Streiff | B01F 3/10 | 366/137 |
| 6,027,241 A * | 2/2000 | King | B01F 3/0873 | 138/38 |
| 6,086,241 A * | 7/2000 | Herr | B01F 5/0451 | 366/181.5 |
| RE36,969 E * | 11/2000 | Streiff | B01F 5/0451 | 239/430 |
| 6,258,144 B1 * | 7/2001 | Huang | B01D 46/0049 | 123/593 |
| 7,028,663 B1 * | 4/2006 | Kim | F01N 13/08 | 123/306 |
| 7,357,565 B2 | 4/2008 | Gopalan et al. | | |
| 7,806,584 B2 * | 10/2010 | Wootan | A01K 63/042 | 366/170.3 |
| 8,082,732 B2 * | 12/2011 | Nefischer | B01D 53/90 | 60/286 |
| 8,673,143 B2 * | 3/2014 | Schneider | B01F 5/0682 | 210/192 |
| 8,745,978 B2 * | 6/2014 | Vanvolsem | B01D 53/90 | 366/336 |
| 9,010,995 B2 * | 4/2015 | Soukup | B01F 5/0688 | 366/336 |
| 2006/0016176 A1 * | 1/2006 | Hilden | F01N 3/0253 | 60/286 |
| 2007/0245718 A1 * | 10/2007 | Cheng | B01F 3/04049 | 60/286 |
| 2008/0066448 A1 * | 3/2008 | Halbei | F01N 3/2066 | 60/282 |
| 2008/0295497 A1 * | 12/2008 | Kornherr | B01D 53/90 | 60/286 |
| 2009/0320453 A1 * | 12/2009 | Salanta | B01F 3/04049 | 60/282 |
| 2010/0293931 A1 * | 11/2010 | Peters | B01D 53/9431 | 60/324 |

* cited by examiner

VORTEX MIXING BAFFLE

CROSS REFERENCE TO RELATED APPLICATION

This application claims the benefit of U.S. Provisional Application No. 61/924,495 filed on Jan. 7, 2014. The above identified patent application is herein incorporated by reference in its entirety to provide continuity of disclosure.

BACKGROUND OF THE INVENTION

Field of the Invention

The present invention relates to water treatment. More specifically, the present invention pertains to an improved vortex mixing baffle that is configured to mix sodium hypochlorite with a water supply for water disinfestation. The present invention includes a baffle pipe encased in a pipe housing. The baffle pipe is configured to create a vortex for continuous mixing of chlorinated water before it exits a bell reducer into a connected storage tank.

Drinking water collected is often collected from unsafe surfaces outside the home and is then held in household storage vessels. Drinking water may be contaminated at the source or during storage. Waterborne diseases are caused by pathogenic microorganisms that most commonly are transmitted in contaminated fresh water. Infection commonly results during bathing, washing, drinking, and in the preparation of food, or the consumption of food thus infected. One method to reduce waterborne disease transmission is to use sodium hypochlorite which is one form of chlorine used for water disinfection. It can be manufactured in most locations since it can be obtained through the electrolysis of salt water. Bottles can be purchased for household water treatment from many manufacturers in various sizes. Different chlorine concentration will require different dosing to disinfect contaminated water. Chlorine began to be widely used as a disinfectant in the early 1900's. It revolutionized drinking water treatment and dramatically reduced the incidence of waterborne diseases. Chlorine remains the most widely used chemical for water disinfection in the United States.

Chlorine forms hydrochloric acid when added to water which causes chemical reactions which deactivate contaminants and reacts through oxidization with micro-organisms, organic matter, manganese, iron, and hydrogen sulfide. Some chlorine is consumed and reacts through oxidization with organic matter and pathogens in the water and kills them. Some chlorine is combined and reacts with other organic matter and forms new chlorine compounds. Excess chlorine that is not consumed or combined remains in the water. This portion is called free residual chlorine which helps prevent recontamination of the treated water.

Water quality usually depends on expensive, long-term centralized projects such as construction of wells, water treatment plants, and water distribution systems. However, when centralized water treatment systems are absent or inadequate, the responsibility for making drinking water falls to community residents or home owners by default. Sodium hypochlorite is relatively safe, easy to distribute and use, inexpensive, and effective against most bacterial and viral pathogens. When added to water in tightly covered containers, volatilization is minimal and hypochlorite disinfectants provides residual protection for many hours to days.

The present invention provides home owners the ability to treat their own sources of water with sodium hypochlorite. The present invention includes a baffle pipe having a proximal end and a distal end, encased in a pipe housing with a first end and second end. The proximal end of the baffle pipe is in liquid communication with a cap that includes an inlet and injection port. The inlet is in liquid communication with the water supply, wherein the injection port is in liquid communication with a sodium hypochlorite solution source configured to inject the water flowing through the inlet with the sodium hypochlorite solution. The distal end of the baffle pipe includes a plurality of angularly spaced pins and projections that position the baffle pipe within the pipe housing. The baffle pipe further includes perforations along its length configured to eject chlorinated water therethrough and force the chlorinated water towards the second end of the pipe housing. The second end includes a bell reducer, wherein the projections on the distal end of the baffle pipe and the bell reducer create a cortex for continuous mixing before the chlorinated water is dispelled through the bell reducer to a connected storage tank.

DESCRIPTION OF THE PRIOR ART

Devices have been disclosed in the prior art that relate to the mixing of liquids and gases. These include devices that have been patented and published in patent application publications. Some devices provide a mixing chamber with a pair of baffles that regulate the flow of water through the mixing chamber and a chlorinator tube that is liquid communication with the mixing chamber. Other devices provide a mixing chamber having an inlet and an outlet passage which is in communication with a second inlet for chlorine gas adapted to mix gaseous chlorine with water. These devices, however, do not disclose a perforated baffle pipe encased in a pipe housing that uses a vortex effect to continuously mix chlorine with water. The foregoing is a list of devices deemed most relevant to the present disclosure, which are herein described for the purposes of highlighting and differentiating the unique aspects of the present invention, and further highlighting the drawbacks existing in the prior art.

Specifically, U.S. Pat. No. 2,361,150 to Petroe discloses a method and apparatus for admitting chlorine to a liquid stream flowing though a pipe and dispersing it throughout the body of the liquid. The Petroe device discloses a pipe such as a Venturi throat where a vena contracta is formed on the downstream side of the throat which creates a region of reduced pressure. The Petroe device further discloses chlorine inlet nozzles which are installed just beyond the region of reduced pressure on the downstream side. However, the Petroe device does not disclose a perforated baffle pipe encased in a pipe housing configured to create a vortex within the pipe housing for continuous mixing.

Similarly, U.S. Pat. No. 7,357,565 to Gopalan discloses an injector which mixes gases into a carrier fluid stream. The disclosed injector includes a body having an internal wall forming a flow passage therethrough, a central axis, an inlet, an outlet and a port for receiving the secondary fluid that is mixed into the carrier fluid. The Gopalan device further discloses a ramp-like restriction located downstream of the inlet and upstream of the port to decrease the flow passage of carrier fluid, a ramp-like expansion located downstream of port and upstream of outlet to increase the flow passage, a throat which is situated between the restriction and expansion, and a cavity for vertical flow of the secondary fluid in the cavity. However, the Gopalan device does not disclose a baffle pipe, with perforations along its length, encased in a pipe housing having a bell reducer configured to create a vortex for continuous mixing before chlorinated water exits the bell reducer into a connected storage tank.

U.S. Pat. No. 2,207,761 to Sayles discloses a liquid mixing device for adding a reagent to a stream of liquid. The Sayles device consists of a chamber open at the bottom, means for supplying liquid to the exterior of the chamber at a constant rate, means for withdrawing liquid from the bottom of the chamber, and means for supplying treating liquid by gravity to the upper part of the chamber. However, the Sayles device does not disclose a perforated baffle pipe configured to create a vortex for continuous mixing of chlorinated water.

U.S. Pat. No. 3,776,524 to Starke is a mixing chamber for mixing gaseous chlorine with water. The Starke device discloses a chamber having an inlet and an outlet passage having an inner and outer end. The inner end is located below the water level and the outlet passage extends in an upward direction above the water level. A second inlet for chlorine gas is in communication with the outlet passage and a constriction defining an opening in the outlet passage between the second inlet and outer end of the outlet passage. However, the Starke device does not disclose a baffle pipe, with perforations in a linear configuration, encased in a pipe housing with a plurality of projections and bell reducer adapted to create a vortex for continuous mixing before chlorinated water exits the bell reducer into a connected storage tank. In addition, the Starke device does not disclose a device having a baffle pipe encased in a pipe housing configured to create a vortex for continuous mixing of chlorinated water therethrough.

Finally, U.S. Pat. No. 4,584,106 to Held discloses a chlorination system for distributing chlorine in a hot tub or spa. The Held device discloses a mixing chamber having an inlet and outlet venturi chamber on each side of the mixing chamber and a pair of baffles to regulate the flow of water through the mixing chamber. A chlorinator tube having one end in fluid communication with the mixing chamber holding chlorine tablets. The water in the mixing chamber dissolves the tablets to form a chlorine solution. The Held device further discloses a stopcock positioned between the outlet and the mixing chamber so that the flow of water through the mixing chamber may be interrupted to place additional chlorination tablets in the chlorination tube. However, the Held device does not disclose a baffle pipe with perforations along its length positioned affixed inside a housing configured to create a vortex for continuous mixing.

The devices disclosed in the prior art have several known drawbacks. Some devices provide a mixing chamber with a pair of baffles that regulate the flow of water through the mixing chamber and a chlorinator tube that is liquid communication with the mixing chamber. Other devices provide a mixing chamber having an inlet and an outlet passage which is in communication with a second inlet for chlorine gas adapted to mix gaseous chlorine with water. However, these devices are do not provide a device that uses a vortex effect to continuously mix chlorine with water.

The present device overcomes these limitations by disclosing a baffle pipe, with perforations along its length, encased in a pipe housing having a bell reducer at its end configured to create a vortex for continuous mixing before chlorinated water exits the bell reducer into a connected storage tank. The baffle pipe also includes an inlet that is in liquid communication with the water supply and an injection port that infuses the water flowing therethrough with a sodium hypochlorite solution. It is therefore submitted that the present invention is substantially divergent in design elements from the prior art, and consequently it is clear that there is a need in the art for an improvement to water treatments, specifically continuously mixing of chlorinated water with a vortex mixing baffle In this regard, the instant invention substantially fulfills these needs.

SUMMARY OF THE INVENTION

In view of the foregoing disadvantages inherent in the known types of mixing devices for water treatment now present in the prior art, the present invention provides a new and improved vortex mixing baffle that is adapted to create a vortex for continuous mixing of water with sodium hypochlorite for water disinfection.

It is therefore an object of the invention to provide a new and improved vortex mixing baffle that has all of the advantages of the prior art and none of the disadvantages.

An object of the present invention is to provide a new and improved vortex mixing baffle that is configured for water treatment and prevent the transmission of waterborne diseases.

Another object of the present invention is to provide a new and improved vortex mixing baffle that provides homeowners the ability to treat their own sources of water with sodium hypochlorite.

Yet another object of the present invention is to provide a new and improved vortex mixing baffle that includes an inlet that is in liquid communication with the water supply.

Another object of the present invention is to provide a new and improved vortex mixing baffle that includes an injection port to infuse the water flowing therethrough with a sodium hypochlorite solution.

Still yet another object of the present invention is to provide a new and improved vortex mixing baffle that includes a baffle pipe with perforations along its length encased in a pipe housing configured to create a vortex for continuous mixing before chlorinated water is dispelled into a connected storage tank.

Still yet another object of the present invention is to provide a new and improved vortex mixing baffle wherein the device may be readily fabricated from materials that permit relative economy and are commensurate with durability.

Other objects, features, and advantages of the present invention will become apparent from the following detailed description taken in conjunction with the accompanying drawings.

BRIEF DESCRIPTIONS OF THE DRAWINGS

Although the characteristic features of this invention will be particularly pointed out in the claims, the invention itself and manner in which it may be made and used may be better understood after a review of the following description, taken in connection with the accompanying drawings wherein the numeral annotations are provided throughout.

DETAILED DESCRIPTION OF THE INVENTION

Figure 1:
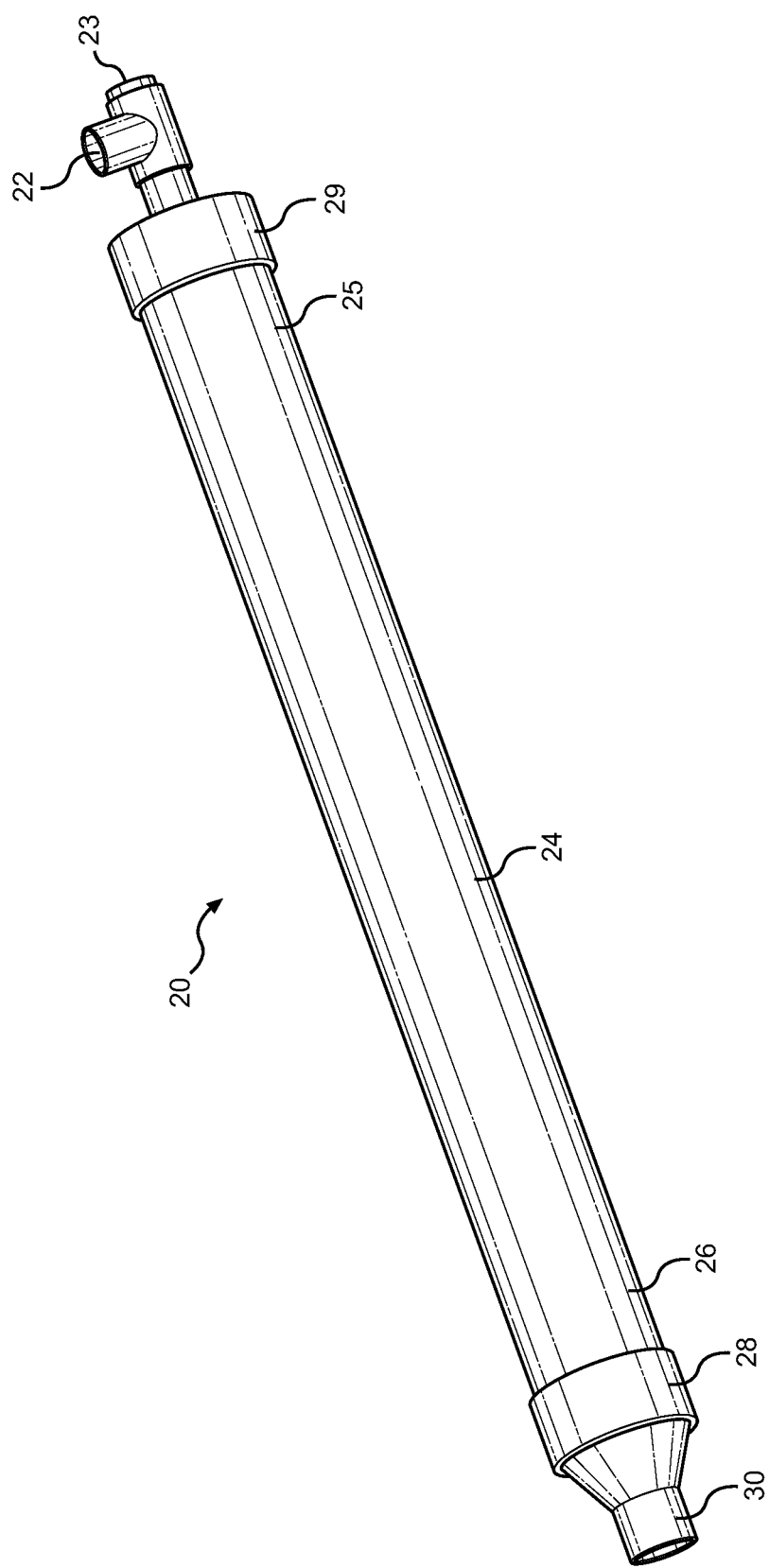
FIG. 1 shows an overhead perspective of the present invention.

References are made herein to the attached drawings. Like reference numerals are used throughout the drawings to depict like or similar elements of the vortex mixing baffle. For the purposes of presenting a brief and clear description of the present invention, the preferred embodiment will be discussed as used to disinfect and chlorinate a water supply with sodium chlorite. The figures are intended for representative purposes only and should not be considered to be limiting in any respect.

Referring now to FIG. 1, there is shown an overhead view of the vortex mixing baffle 20. The vortex mixing baffle 20 provides homeowners the ability to treat their own water sources with sodium hypochlorite. The vortex mixing baffle 20 comprises a pipe housing 24 having an open first end 25 and an open second end 26 forming a hollow interior that encloses a baffle pipe extending therethrough. The open first end 25 includes a cap 29 that can be removably attached and includes an inlet 23 and an injection port 22 in liquid communication with one another. The inlet 23 is configured to be in liquid communication with a water supply, while the injection port 22 is configured to be in liquid communication with a sodium hypochlorite solution and designed to pump the sodium hypochlorite solution into the water supplied by the inlet 23. The open second end 26 further includes a removably attached bell reducer 28 that is configured to create a vortex therein for continuous mixing of the chlorinated water before it is dispersed through an outlet 30 of the bell reducer 28.

Figure 2:
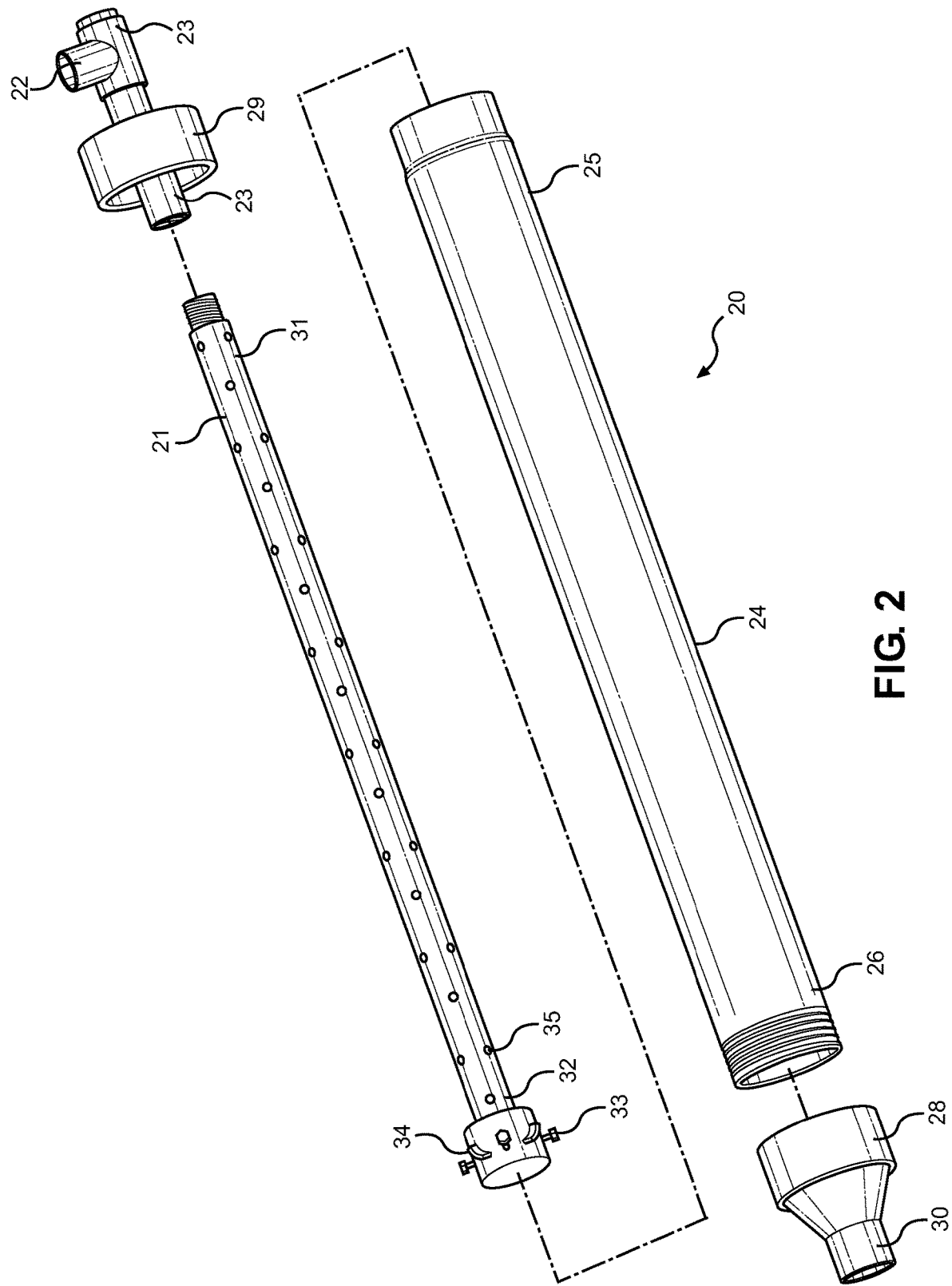
FIG. 2 shows an overhead perspective of the present invention broken into individual components.
Figure 3:
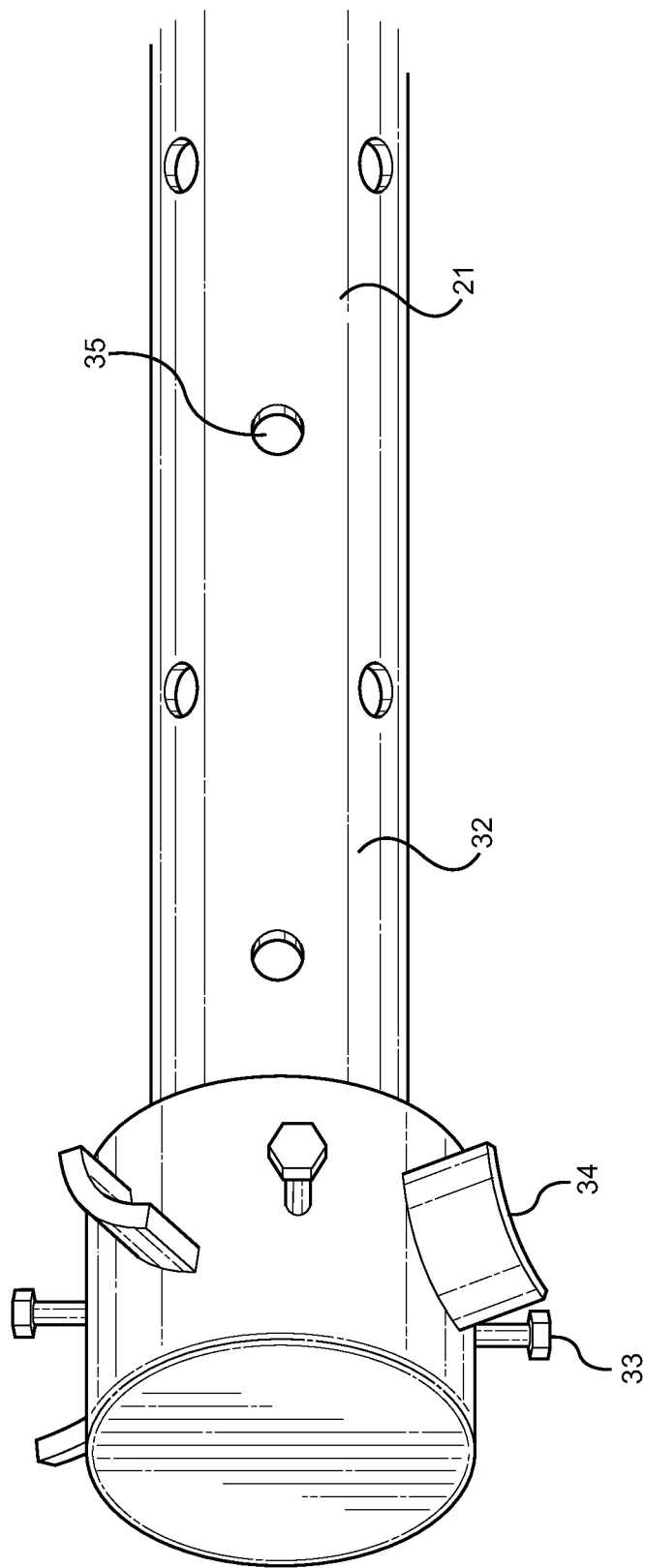
FIG. 3 shows a close-up view of the second end of the baffle pipe of the present invention.

Referring now to FIGS. 2 and 3, there is shown an overhead view of the vortex mixing baffle 20 broken down into components. The cap 29 is a cylindrical cover that is removably attached to the first end 25 of the pipe housing 24. Preferably, the cap 29 is removably fastened to the first end 25 with a friction fit, wherein cap 29 includes a male mating element and first end 25 has an aligning female mating element. In other embodiments, the cap 29 is alternative composed of male threaded elements, wherein the first end 25 comprises aligning female threaded elements to removably attach the cap 29 to the first end 25.

The second end 26 is removably attached to the bell reducer 28, wherein the second end 26 is includes male threaded elements and the bell reducer 28 has aligning female threaded elements to removably fasten the second end 26 to the bell reducer 28. The bell reducer 28 is substantially shaped like a bell, wherein the bell reducer 28 has an opening that is attached to the second end 26 of the pipe housing 24 having substantially the same diameter as the second end 26 of the pipe housing 24. The bell reducer 28 further includes an outlet 30 on the opposite end that is configured to reduce the size of the pipe housing 24 to control the dispersal of chlorinated water.

The pipe housing 24 encases the baffle pipe 21 extending therethrough, wherein the baffle pipe 21 comprises a proximal end 31 and a distal end 32. The proximal end 31 is removably attached to the inlet 23, wherein the injection port 22 is substantially in a perpendicular position in relation to the inlet 23 and the baffle pipe 21. The distal end 32 comprises a plurality of angularly spaced pins 33 and plurality of projections 34. The plurality of angularly spaced pins 33 are configured to hold the baffle pipe 21 in a central location within the pipe housing 24. The plurality of projections 34 are articulated curved walls that substantially align downstream towards the bell reducer 28. The projections 34 and the bell reducer 28 are designed to create a vortex for continuous mixing of chlorinated water before it exits through outlet 30 into a connected storage tank.

The baffle pipe 21 further comprises a plurality of perforations 35 along its length between the proximal end 31 and the distal end 32. Chlorinated water is forced downstream from the inlet 23 to the baffle pipe 21 and is ejected through the perforations 35 to the pipe housing 24 as the chlorinated water flows downstream towards the second end 26 and the distal end 32 of the baffle pipe 21. The angularly spaced pins 33 are equidistant from one another enabling an equal distribution of water flow towards the bell reducer 28. The projections 34 and the bell reducer 28 create a vortex within the pipe housing 24 axially around the baffle pipe 21 with the chlorinated water therein. The perforations 35, in other embodiments are alternatively sized larger or smaller, with more or less of the perforations 35. The perforations 35, in other embodiments, however, remain equidistant along the length of the baffle pipe 21.

The baffle pipe 21, in the preferred embodiment, is one inch in diameter. The baffle pipe 21 is encased in the pipe housing 24, which is preferably three inches in diameter. The vortex mixing baffle 20 is preferably composed of a polyvinyl chloride material, however, without limitation other embodiments are alternatively composed of other durable and corrosion-free plastics.

Figure 4:
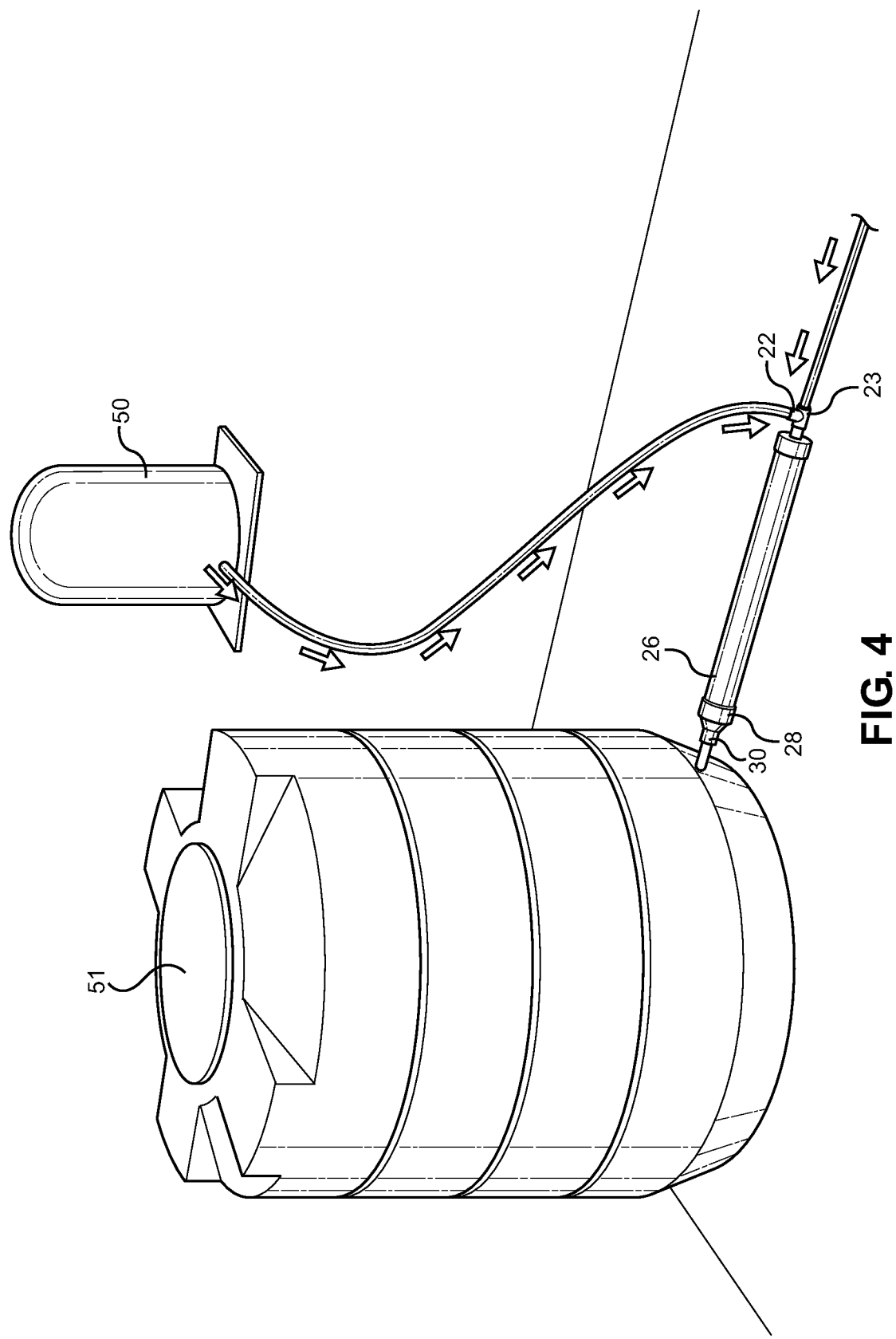
FIG. 4 shows an overhead view of the present invention in operation as used to disinfect water by treating a water supply with sodium hypochlorite before entering a connected storage tank.

Referring now to FIG. 4, the inlet 22 is in liquid communication with a utility pump that moves the water supply to the inlet 23. A second utility pump is coupled to the sodium chlorite solution source 50 which allows the sodium chlorite solution to be dispersed through the injection port 22 to infuse the water flowing through the inlet 23. The chlorinated water is forced downstream towards the baffle pipe, wherein the chlorinated water is ejected through the perforations into the pipe housing 24. The second end 26, the bell reducer 28, and the distal end of the baffle pipe having the plurality of angular spaced pins and projections, create a vortex for continuous mixing within the pipe housing 24. The bell reducer 28 further includes an outlet 30 that disperses the chlorinated water into a connected storage tank 51.

In the preferred embodiment, the vortex mixing baffle 20 is configured to disinfect and treat five to twenty gallons per minute. Larger and smaller embodiments are configured to disinfect and treat water at a faster or slower rate, respectively. Specifically, there is a larger alternative embodiment that can disinfect and treat water at a rate that exceeds forty gallons per minute.

It is therefore submitted that the instant invention has been shown and described in what is considered to be the most practical and preferred embodiments. It is recognized, however, that departures may be made within the scope of the invention and that obvious modifications will occur to a person skilled in the art. With respect to the above descriptions then, it is to be realized that the optimum dimensional relationships for the parts of the invention, to include variations in size, materials, shape, form, function, and manner of operation, assembly and use, are deemed readily apparent and obvious to one skilled in the art, and all equivalent relationships to those illustrated in the drawings and described in the specifications are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A vortex mixing baffle for home treatment of water supply with sodium hypochlorite, comprising:
    a pipe housing having an open first end and an open second end;
    wherein said pipe housing encloses a baffle pipe extending therethrough;
    said open first end having removably attached to a cap;
    said cap having an inlet and an injection port in liquid communication, said injection port extending perpendicularly outwardly from said inlet;
    said inlet in liquid communication with a water supply;
    said injection port configured to introduce a sodium hypochlorite solution into water supplied by said inlet;
    said baffle pipe having a proximal and a distal end;
    said proximal end removably attached to said inlet;
    said open second end removably attached to a bell reducer;
    said distal end comprising a plurality of angularly spaced pins and a plurality of articulated curved walls, wherein each articulated curved wall of the plurality of articulated curved walls is positioned between a pair of angularly solid spaced pins of the plurality of angularly spaced pins;
    wherein the plurality of angularly spaced pins are configured to contact the pipe housing to hold the baffle pipe in a central location within the pipe housing.

2. The vortex mixing baffle for home treatment of water supply with sodium hypochlorite of claim 1, wherein:
    said baffle pipe further comprising a plurality of perforations extending along its length;
    wherein said perforations are configured to eject chlorinated water into said pipe housing.

3. The vortex mixing baffle for home treatment of water supply with sodium hypochlorite of claim 1, wherein:
    said cap is configured to removably secure over said open first end by friction fit.

4. The vortex mixing baffle for home treatment of water supply with sodium hypochlorite of claim 1, wherein:
    said bell reducer is configured to removably secure to said open second end by a threaded connection therewith.

5. The vortex mixing baffle for home treatment of water supply with sodium hypochlorite of claim 1, wherein: said plurality of articulated curved walls are positioned equidistant from one another.

6. The vortex mixing baffle for home treatment of water supply with sodium hypochlorite of claim 5, wherein:
    said articulated curved walls are substantially curved towards said bell reducer.

7. The vortex mixing baffle for home treatment of water supply with sodium hypochlorite of claim 6, wherein:
    said articulated curved walls and said bell reducer are configured to create a vortex within said pipe housing around said baffle pipe to continuously mix said chlorinated water before releasing said chlorinated water into a connected storage tank.

8. The vortex mixing baffle for home treatment of water supply with sodium hypochlorite of claim 1, wherein:
    said bell reducer is substantially shaped like a bell with an opening that is substantially sized to align with said open second end of said pipe housing.

9. The vortex mixing baffle for home treatment of water supply with sodium hypochlorite of claim 7, wherein:
    said bell reducer further comprising an outlet configured to release said chlorinated water into said connected storage tank.

* * * * *